United States Patent
Guerzhoy et al.

(10) Patent No.: US 8,098,936 B2
(45) Date of Patent: Jan. 17, 2012

(54) METHOD AND APPARATUS FOR DETECTING OBJECTS IN AN IMAGE

(75) Inventors: Michael Guerzhoy, North York (CA); Hui Zhou, Toronto (CA)

(73) Assignee: Seiko Epson Corporation, Tokyo (JP)

( * ) Notice: Subject to any disclaimer, the term of this patent is extended or adjusted under 35 U.S.C. 154(b) by 1104 days.

(21) Appl. No.: 11/936,865

(22) Filed: Nov. 8, 2007

(65) Prior Publication Data

US 2008/0170784 A1      Jul. 17, 2008

Related U.S. Application Data

(60) Provisional application No. 60/884,776, filed on Jan. 12, 2007.

(51) Int. Cl.
*G06K 9/00* (2006.01)

(52) U.S. Cl. ......... 382/181; 345/441; 345/619; 382/286

(58) Field of Classification Search .......... 345/441, 345/619, 629; 382/181, 190, 199, 286
See application file for complete search history.

(56) References Cited

U.S. PATENT DOCUMENTS

| | | | |
|---|---|---|---|
| 4,870,500 A | | 9/1989 | Nagashima |
| 5,065,344 A | * | 11/1991 | Kishimoto et al. ........... 345/626 |
| 6,181,820 B1 | * | 1/2001 | Tachikawa et al. ........... 382/190 |
| 6,335,985 B1 | | 1/2002 | Sambonsugi et al. |
| 6,898,316 B2 | | 5/2005 | Zhou |
| 6,990,235 B2 | * | 1/2006 | Katsuyama ................... 382/173 |
| 7,177,488 B2 | * | 2/2007 | Berkner et al. ............... 382/298 |
| 7,542,608 B2 | * | 6/2009 | Yeh et al. ..................... 382/199 |
| 7,570,792 B2 | * | 8/2009 | Takahashi .................... 382/132 |
| 7,623,734 B2 | * | 11/2009 | Herley ......................... 382/286 |
| 2003/0091227 A1 | * | 5/2003 | Chang et al. ................. 382/154 |
| 2003/0095709 A1 | | 5/2003 | Zhou |
| 2003/0158846 A1 | * | 8/2003 | Ikehata et al. ................... 707/7 |
| 2004/0146198 A1 | | 7/2004 | Herley |
| 2004/0181749 A1 | | 9/2004 | Chellapilla et al. |
| 2004/0258313 A1 | | 12/2004 | Jones et al. |
| 2005/0105766 A1 | | 5/2005 | Fesquet et al. |
| 2005/0180632 A1 | | 8/2005 | Aradhye et al. |
| 2005/0180635 A1 | | 8/2005 | Trifonov et al. |
| 2007/0133900 A1 | * | 6/2007 | Nielsen et al. ................ 382/282 |

FOREIGN PATENT DOCUMENTS

EP    1091320 A2    4/2001

OTHER PUBLICATIONS

Straight-line-based primitive extraction in grey-scale object recognition, Dmitry Lagunovsky and Sergey Ablameyko, Institute of Engineering Cybernetics, Belarussian Academy of Sciences, Received Oct. 27, 1997, received in revised form Apr. 7, 1999, (pp. 1006-1013).
Recursive Method to Extract Rectangular Objects From Scans, Cormac Herley, Institute of Electrical and Electronics Engineers, Proceedings 2003 International Conference on Image Processing, ICIP-2003. Barcelona, Spain, Sep. 14-17, 2003, (pp. 1-5).

* cited by examiner

*Primary Examiner* — Gregory M Desire

(57) ABSTRACT

A method of detecting generally rectangular objects in an image comprises determining candidate rectangles in the image based on detected corners in the image, ranking the candidate rectangles on the basis of a set of differentiating factors and detecting objects in the images based on the ranked candidate rectangles.

15 Claims, 5 Drawing Sheets

METHOD AND APPARATUS FOR DETECTING OBJECTS IN AN IMAGE

CROSS-REFERENCE TO RELATE APPLICATIONS

This application claims the benefit of U.S. Provisional Application Ser. No. 60/884,776, filed on Jan. 12, 2007, the content of which is incorporated herein by reference.

FIELD OF THE INVENTION

The present invention relates generally to image processing and in particular, to a method and apparatus for detecting objects in an image.

BACKGROUND OF THE INVENTION

Scanners for capturing images of paper documents, photographs and/or other objects including for example debit and credit cards, and converting the captured images into electronic files are well known in the art. Although such canners have a variety of general and specific uses, they are most commonly used to scan documents in order to consolidate records, create paperless work environments and/or facilitate the electronic transmission of information.

Scanners vary in design and sophistication, but generally all scanners comprise an elongate light source and a grid or series of sensors for receiving light that is reflected off of the surface of the object being scanned. The data from the sensors is collected by a processor operating under control of scanner software and stored in memory as a digital image file typically in JPEG, BMP or GIF format. If the scanner is coupled to a computer or to a local or wide area network, the digital image file is typically made available to the computer and/or to network devices for storage and/or further processing.

In some situations, during the scanning process multiple objects are placed on the scanner bed and then scanned resulting in a single image that includes the multiple objects. For example, a number of photographs may be placed on the scanner bed and then scanned to generate a single image including all of the photographs. As will be appreciated, when an image comprising multiple objects is to be further processed, it may be desired to process the image so that the individual objects in the image can be detected and separated. Not surprisingly, many techniques for detecting objects in images have considered.

For example, U.S. Pat. No. 6,335,985 to Sambonsugi et al. discloses a method in which three rectangles are set to surround three temporally continuous frames. Difference images are obtained on the basis of the inter-frame differences between the current frame and a first reference frame, and between the current frame and a second reference frame. Background regions are respectively determined for polygons, and the remaining regions are selected as object region candidates. By obtaining the intersection between the object region candidates, an object region in the current frame can be extracted.

U.S. Pat. No. 6,898,316 to Zhou discloses a method for detecting an image area in a digital image. During the method, a first image region indicative of a background area and a second image region indicative of a foreground area are identified in the image. Gradient values are computed using the pixel values of the digital image. A list of strokes based on the gradient values is defined and the list of strokes is merged. A list of corners is defined using the list of strokes and an image area rectangle delimiting the image area is defined using the list of corners and the list of strokes. The image area rectangle can be used to define a bounding box for extracting the foreground area from the digital image.

U.S. Patent Application Publication No. 2004/0146198 to Herley discloses an object detection and extraction system and method for processing digital image data. Objects contained within a single image are segregated allowing those objects to be considered as individual objects. The object detection and extraction method takes an image containing one or more objects of known shape (such as rectangular objects) and finds the number of objects along with their size, orientation and position. In particular, the object detection and extraction method classifies each pixel in an image containing one or more objects to obtain pixel classification data. An image function is defined to process the pixel classification data and the image is divided into sub-images based on disparities or gaps in the image function. Each of the sub-images is processed to determine a size and an orientation for each of the objects.

U.S. Patent Application Publication No. 2004/0181749 to Chellapilla et al. discloses a computer-implemented method and apparatus for populating an electronic form from an electronic image. The size, orientation and position of an object within the electronic image is initially identified together with information elements from pixels within the image that correspond to the object. Fields of the electronic form are displayed to a user along with the identified information elements through a graphical user interface. The information elements are parsed into tagged groups of different information types. At least some of the fields of the electronic form are populated with the tagged groups to produce a populated form. The populated fields can be edited through the graphical user interface.

U.S. Patent Application Publication No. 2004/0258313 to Jones et al. discloses a method for detecting a specific object in an image. During the method, the orientation of an arbitrary object with respect to an image plane is determined and one of a plurality of orientation and object specific classifiers is selected according to the determined orientation. The arbitrary object is classified as a specific object by the selected orientation and object specific classifier.

U.S. Patent Application Publication No. 2005/0105766 to Fesquet et al. discloses a method of detecting single postal items and multiple overlapping postal items in a postal sorting installation. During the method, images representing postal items viewed from the front are analyzed and an outline-extracting process is applied to each image in order to recognize items having an outline of substantially constant height.

U.S. Patent Application Publication No. 2005/0180632 to Aradhye et al. discloses an apparatus and a concomitant method for rectification and recognition of symbols to correct for the effects of perspective distortion, rotation and/or scale in images of three-dimensional scenes. The method locates a reference region lying in a common plane with a symbol to be recognized. The reference region represents an image of a planar object having assumed (e.g. known or standard) geometry and dimensions. At least four easily detectable correspondence points within that geometry are located. An image of the common plane is then rectified in three dimensions in accordance with the assumed dimensions of the reference region in order to produce a transformed image of the symbol.

U.S. Patent Application Publication No. 2005/0180635 to Trifonov et al. discloses a method in which a boundary in an image is determined by first identifying a search region within the image. Image gradients in the search region are determined together with multiple color regions within the search region. An active contour representing the boundary is created based on the image gradients and the multiple color regions.

Other methods of detecting objects in images are disclosed in the following non-patent literature:

"Rectangle Detection Based On A Windowed Hough Transform" authored by C. Jung et al. (Proceedings of the XVII Brazilian Symposium on Computer Graphics and Image Processing; 1530-1834; 2004);

"Automatic Particle Detection Through Efficient Hough Transforms" authored by Y. Zhu et al. (IEEE Trans. on Medical Imaging; 22(9): 1053-1062; 2003);

"Detecting Circular And Rectangular Particles Based On Geometric Feature Detection In Electron Micrographs" authored by Z. Yu et al. (Journal of Structural Biology; 145, 168-180; 2004);

"Recursive Method To Extract Rectangular Objects From Scans" authored by C. Herley (ICIP, vol. 3 no. pp. III-989-92, 14-17; 2003);

"Recursive Method To Detect And Segment Multiple Rectangular Objects In Scanned Images" authored by C. Herley (Technical report MSR-TR-2004-01, Microsoft Research; 2004); and "Efficient Inscribing Of Noisy Rectangular Objects In Scanned Images" authored by C. Herely (ICIP, Vol. 4, 2399-2402, 24-27; 2004).

Although the references discussed above disclose various methods and systems for detecting objects in images, improvements are desired. It is therefore an object of the present invention to provide a novel method and apparatus for detecting objects in an image.

SUMMARY OF THE INVENTION

Accordingly, in one aspect there is provided a method of detecting generally rectangular objects in an image comprising:

determining candidate rectangles in the image based on detected corners in the image;

ranking the candidate rectangles on the basis of a set of differentiating factors; and detecting objects in said images based on the ranked candidate rectangles.

In one embodiment, prior to the ranking, selected candidate rectangles are discarded. The selected candidate rectangles are discarded when they overlap with higher ranked candidate rectangles by more than a threshold amount. Prior to ranking, proximate candidate rectangles may be merged and boundaries of the candidate rectangles may be adjusted.

In one embodiment, the determining comprises estimating a background color of the image, detecting edges delimiting the objects on the basis of the estimated background color, examining the edges to detect intersecting edges representing corners, and grouping corners that define vertices of a rectangle thereby to determine the candidate rectangles. The set of differentiating factors in one embodiment is based on edge and color information associated with pixels proximate the candidate rectangles.

According to another aspect there is provided a method of estimating background color in an image comprising:

segmenting each scan line of the image into like-color line segments;

grouping the like-color segments by color; and estimating the background color on the basis of edge pixels along the line segments of said groups.

In one embodiment, during the grouping only like-color line segments exceeding a threshold length are grouped. The estimating is made on the basis of the number and strength of edge pixels. The estimating comprises determining the groups of like-color line segments having a threshold number of line segments, designating the average color of each group of like-color line segments as a candidate background color, for each candidate background color, detecting edge pixels along the line segments of the group representing that candidate background color, calculating the strength of edges defined by the edge pixels, and selecting one of the candidate background colors as the background color estimate based on edge pixel count and edge strength.

According to yet another aspect there is provided an apparatus for detecting objects in an image comprising:

memory for storing the image; and processing structure communicating with said memory, said processing structure processing the image to determine candidate rectangles based on detected corners in the image, rank the candidate rectangles on the basis of a set of differentiating factors, and determine objects in the images from the ranked candidate rectangles.

According to still yet another aspect there is provided an apparatus for estimating background color in an image comprising:

memory for storing said image; and processing structure communicating with said memory, said processing structure processing the image to segment each scan line into like-color line segments, group the like-color line segments by color and estimate the background color on the basis of edge pixels along the line segments of the groups.

BRIEF DESCRIPTION OF THE DRAWINGS

Embodiments will now be described more fully with reference to the accompanying drawings in which.

DETAILED DESCRIPTION OF THE EMBODIMENTS

Figure 1:
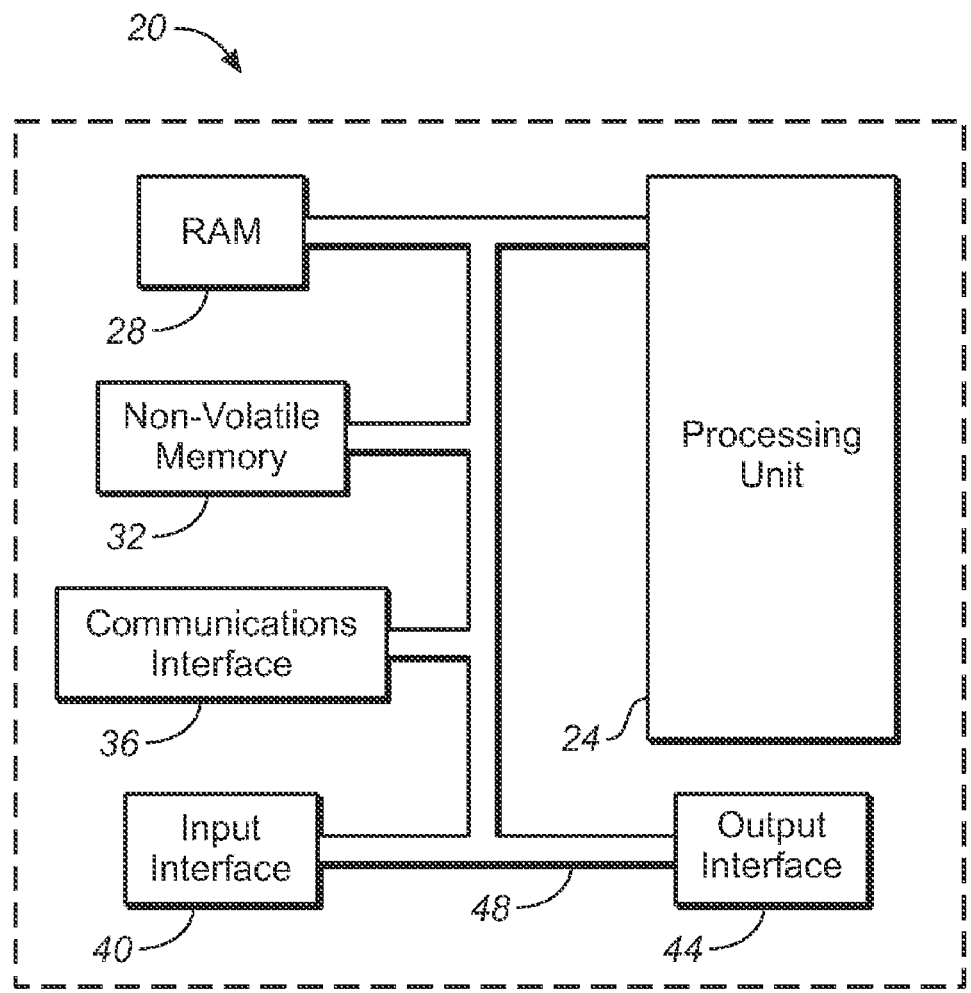
FIG. 1 is a schematic block diagram of an apparatus for detecting objects in an image.

Turning now to FIG. 1, an apparatus for detecting objects in an input digital image is shown and is generally identified by reference numeral 20. In this embodiment, the apparatus 20 is embodied by processing structure such as for example a personal computer or other suitable processing device. The apparatus 20 comprises a processing unit 24, random access memory ("RAM") 28, non-volatile memory 32, a communications interface 36, an input interface 40 and an output interface 44, all in communication over a local bus 48. The processing unit 24 executes an object detection application stored in the non-volatile memory 32. The apparatus 20 can be coupled to a network or server via the communications interface 36. The input interface 40 comprises a keypad, a mouse and/or other user input devices to enable a user to interact with the object detection application. The input interface 40 can also include a scanner for capturing images to be analyzed for object detection. The output interface 44 comprises a display for visually presenting the results of object detection and for displaying settings of the object detection application to allow for their adjustment by the user.

Figure 2:
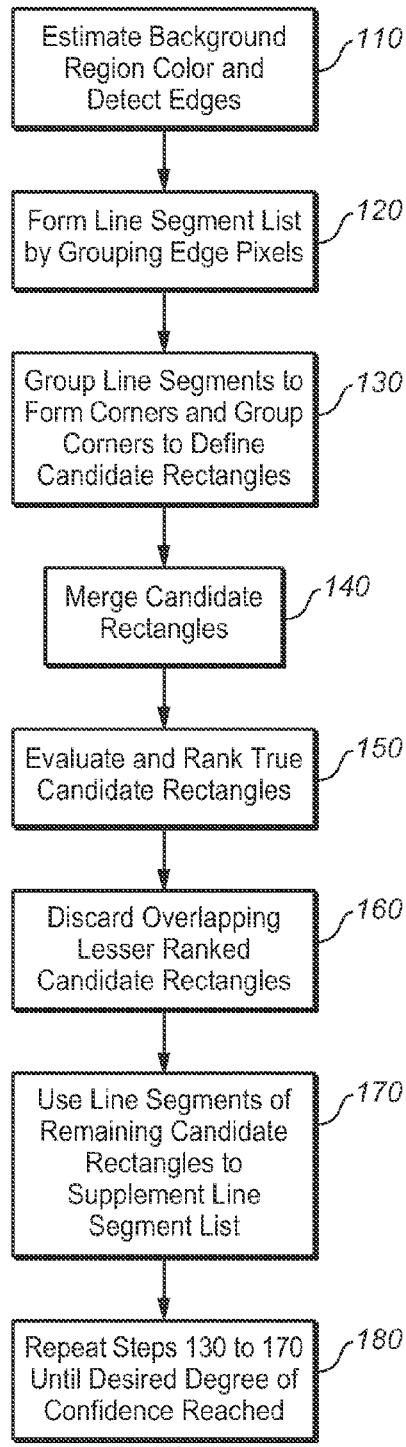
FIG. 2 is a flowchart showing the general steps performed by the apparatus of FIG. 1 during execution of an object detection application in order to detect objects in an image.

FIG. 2 shows the general steps performed by the apparatus 20 during execution of the object detection application in order to detect objects in an input digital image. In this embodiment, the apparatus 20 processes each input image to detect the existence of generally rectangular photographs in the input image. Initially the color of the background region of the input image is estimated and edges delineating photographs in the input image are detected (step 110). Edge pixels along the detected edges are then grouped to form line segments and the formed line segments are entered in a list (step 120). The line segments in the list are then grouped to form right-angled corners and groups of right-angled corners that define the vertices of candidate rectangles are determined (step 130). Candidate rectangles that generally coincide are then merged (step 140). The remaining candidate rectangles are then evaluated to distinguish between true candidate rectangles and false candidate rectangles and the true candidate rectangles are ranked (step 150). Lesser ranked candidate rectangles that overlap higher ranked candidate rectangles are then discarded (step 160). The line segments of the remaining candidate rectangles are then used to supplement the line segment list created at step 120 (step 170). Steps 130 to 170 are performed iteratively until candidate rectangles corresponding to the photographs in the input image having the desired degree of confidence are determined (step 180).

In this embodiment, it is assumed that the background region of the input image is of a generally uniform color and that the borders of photographs in the input image have a discernable difference from edges in the image background so that the edges delineating the photographs are strong in relation to other edges in the input image. Employing these assumptions and given the approximate size, shape and number of photographs in an input image, the border of each photograph in the input image can be accurately estimated.

A five (5) step, single-pass approach that relies on a heuristic examination of low level image features is used to estimate the background region color at step 110. In particular, scan lines i.e. pixel rows and pixel columns, of the input image are firstly segmented into uniform-colored segments. Edge detection is then performed and the edge information is used to select the line segment colors that represent candidate background region colors. The edge information is then combined with scan line segmentation information to determine which of the candidate background region colors is the true background region color. Further specifics concerning the above approach will now be described with reference to FIGS. 3 to 5.

Figure 3:
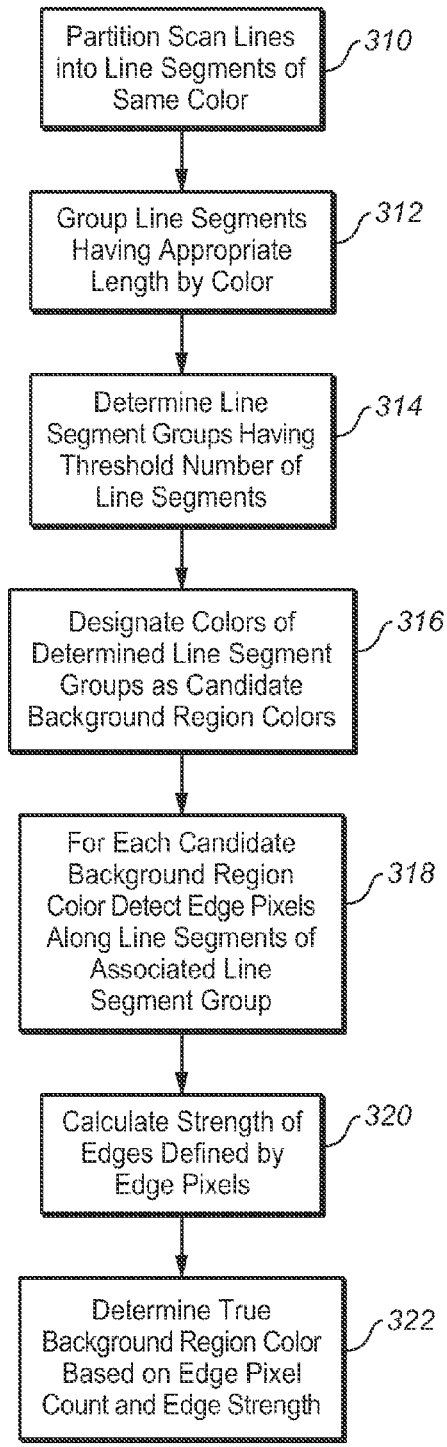
FIG. 3 is a flowchart showing the steps performed during background color estimation and edge detection.

Turning now to FIG. 3, the steps performed during background region color estimation and edge detection at step 110 are better illustrated. Initially the scan lines of the input image are partitioned into line segments of generally the same color (step 310). Assuming that there will be many long line segments of the background color, line segments having a length beyond a threshold value are determined and are grouped by color (step 312). The groups of line segments having more than a threshold number of line segments are then determined (step 314) and the colors associated with these line segment groups are designated as candidate background region colors (step 316). For each candidate background region color, edge pixels along the line segments of the associated line segment group that are on the boundaries between the background region and the photographs in the input image are detected (step 318). The strength of the edges defined by the edge pixels is then calculated (step 320). The true background region color is then determined to be the color associated with the line segment group that has an edge pixel count within a specified range and whose average edge strength is the largest (step 322).

Figure 4:
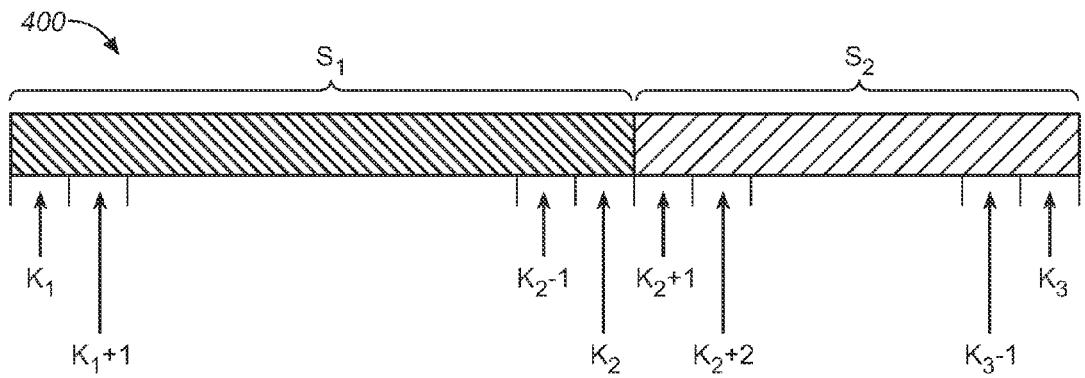
FIG. 4 is a portion of a scan line.
Figure 5:
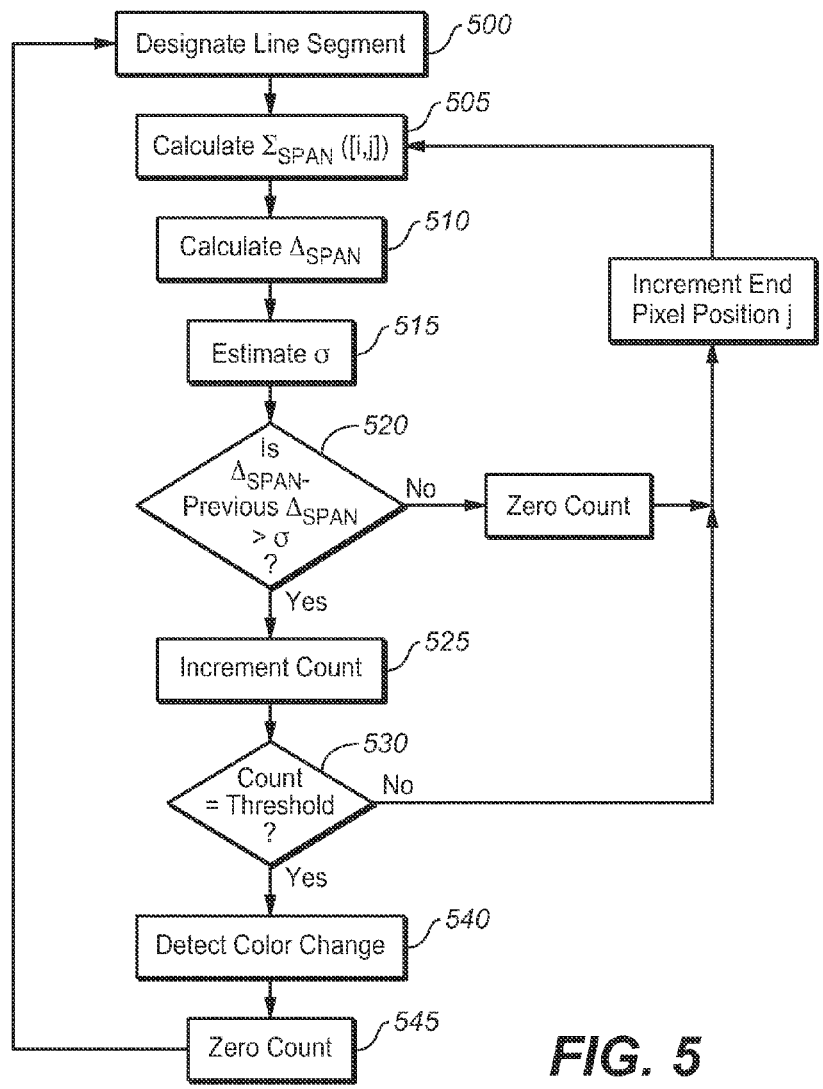
FIG. 5 is a flowchart showing the steps performed in order to detect color changes along a scan line.

Partitioning of the scan lines into line segments of like-color at step 310 will now be further discussed with reference to FIGS. 4 and 5. FIG. 4 shows an exemplary scan line 400 comprising pixels $k_1$ through $k_3$. As can be seen, the scan line 400 in this example has two (2) line segments $s_1$ and $s_2$ of distinct color separated by pixels $k_2$ and $k_2+1$ respectively. Line segment $s_1$ comprises pixels $k_1$ to $k_2$ ($s_1=[k_2 1, k_3]$). The red, green, blue and line segment $s_2$ comprises pixels $k_2+1$ to $k_3$ ($s_2=[k_2+1, k_3]$). The red, green, blue (RGB) color vector of each pixel k is represented by color(k). It is assumed that the colors of the pixels k on the line segments $s_1$ and $s_2$ are normally distributed about a mean color $C_s$. It is also assumed that the standard deviation $\sigma$ of the colors is significantly smaller than the difference between the mean color $C_1$ of line segment $s_1$ and the mean color $C_2$ of line segment $s_2$.

For the line segments $s_1$ and $s_2$, the mean colors $C_1$ and $C_2$ respectively are expressed by Equations (1) and (2) below:

$$C_1 = \Sigma_{k1,k2}\, \mathrm{color}(k)/(k_2-k_1); \text{ and} \tag{1}$$

$$C_2 = \Sigma_{k2+1,k3}\, \mathrm{color}(k)/(k_3-(k_2+1)) \tag{2}$$

The standard deviations $\sigma_1$ and $\sigma_2$ for the line segments $s_1$ and $s_2$ are expressed by Equations (3) and (4) below:

$$\sigma_1 = \sigma_{k1,k2}\, \mathrm{color}(k); \text{ and} \tag{3}$$

$$\sigma_2 = \sigma_{k2+1,k3}\, \mathrm{color}(k) \tag{4}$$

The color vectors of the line segments $s_1$ and $s_2$ are distributed according to Equations (5) and (6) below:

$$\mathrm{color}(k) = C_1 \pm \sigma_1,\ k \in [k_1, k_2]; \text{ and} \tag{5}$$

$$\mathrm{color}(k) = C_2 \pm \sigma_2,\ k \in [k_2+1, k_3], \tag{6}$$

where: $k_1 < k_2 < k_3$;

$C_1 \neq C_2$;

$\sigma_i \sim N(0, \sigma)$; and $\|\sigma\|_\infty \ll \|C_1 - C_2\|_\infty$

In order to detect changes in line segment color, a span value $\Sigma_{SPAN}([i,j])$ is defined based on a span averaging function according to Equation (7) below:

$$\Sigma_{SPAN}([i,j]) = \frac{\sum_{k=i}^{j} \mathrm{color}(k)}{(j-i)} \tag{7}$$

From Equation (7), it can be seen that the span difference $\Delta_{SPAN} = \Sigma_{SPAN}([k_1,j+1]) - \Sigma_{SPAN}([k_1,j])$ is symmetrically distributed about the zero vector for $j<k_2$. The span difference $\Delta_{SPAN}$ is also symmetrically distributed around $$\frac{k_1(C_2 - C_1)}{j^2} \text{ for } j \geq k_2.$$ (5)

As a result, for $j \geq k_2$, the span difference $\Delta_{SPAN}$ diverges from zero.

As will be appreciated from the above, color changes along each scan line can therefore be detected by identifying significant non-zero span differences $\Delta_{SPAN}$. Turning now to FIG. 5, the steps performed during examination of a scan line to detect color changes therealong are shown. Initially, a line segment s is designated on the scan line beginning at pixel i and ending at pixel j i.e. s=[i, j] (step 500). The span value $\Sigma_{SPAN}([i,j])$ is then calculated for j=i+1 according to Equation (7) (step 505). The span difference $\Delta_{SPAN}=\Sigma_{SPAN}([i,j])-\Sigma_{SPAN}([i,j-1])$ is then calculated (step 510) and the deviation σ is estimated (step 515). The current span difference $\Delta_{SPAN}$ is then compared to the span difference $\Delta_{SPAN}$ calculated in the previous iteration to determine if the difference exceeds the deviation σ computed at step 515 (step 520). If the difference exceeds the deviation σ, a count is incremented (step 525). A check is then made to determine if the count has reached a threshold value (step 530). In this embodiment, the threshold value is equal to three (3). At step 530, if the count does not equal the threshold value, the line segment end pixel position j is incremented (step 535) and the process reverts back to step 505 for the next iteration. At step 530, if the count has reached the threshold value, a change in color along the scan line is detected at end pixel position j−2 (i.e. the end pixel position where the difference was first determined to exceed the deviation σ) (step 540). This end pixel position designates the beginning of the next line segment along the scan line and marks the end of the previous line segment. At this point, the count is zeroed (step 545) and the process reverts back to step 500, where the next line segment is designated. At step 520, if the difference does not exceed the deviation σ, the count is zeroed (step 550). The end pixel position j is then incremented at step 535 prior to reverting back to step 505 for the next iteration.

Appendix A is a pseudocode implementation of the above line segment color change detection method. Three (3) consecutive non-zero span differences $\Delta_{SPAN}$ are required in order for a color change along a scan line to be detected thereby to avoid false color change detections due to noise. This number of non-zero span differences $\Delta_{SPAN}$ has been found to yield accurate results with few false color change detections. Detecting color changes along scan lines in this manner overcomes the disadvantage associated with using a comb filter solution, which is prone to errors due to noise.

In designating candidate background region colors, it is presumed that background region colors will be represented by like-color line segments that are numerous and long. In order to categorize like-color line segments at step 312, three equal sized arrays are established, namely a voting array, a color array and a variance array. Corresponding cells of each array are assigned to each line segment average color. In this embodiment, it is assumed the colors are twenty-four (24) bit RGB and are represented by ([R/16], [G/16], [B/16]). For each line segment that is longer than a threshold length, the number of pixels ("votes") in the line segment is determined and is entered into the cell of the voting array that corresponds to the average color of that line segment.

In addition, for each line segment that is longer than the threshold length a point estimate is calculated according to Equation (8) below:

votes*(average line segment color) (8)

and a color spread estimate is calculated according to Equation (9) below:

votes*(line segment variance). (9)

The calculated point estimate is entered into the cell of the color array that corresponds to the average color of the line segment and the calculated color spread estimate is entered into the cell of the variance array that corresponds to the average color of the line segment. Appendix B is a pseudocode implementation of the above procedure.

Once all of the line segments exceeding the threshold length have been processed and the cells of the voting, color and variance arrays have been populated, the line segment groups having line segments exceeding a threshold number are determined (step 314) and from these line segment groups, the ten (10) highest populated cells of the voting array are selected. The average colors of the line segment groups associated with these selected voting array cells are designated as the candidate background region colors (step 316). The average color vector and variance for each of the selected voting array cells is calculated by dividing the point estimate in the corresponding cell of the color array and the color spread estimate in the corresponding cell of the variance array by the vote value in the voting array cell. The average colors of the line segment groups associated with the selected voting array cells are subsequently examined to identify aliasing. Each of the selected voting array cells has twenty-six (26) neighboring cells. During identification of aliasing, the average color of the line segment groups associated with each of the selected voting array cells is compared with the line segment average color associated with each of its neighboring voting array cells to determine if the colors are the same. Two colors C centered in neighboring cells are considered to be the same color if:

$|C(cell_1)-C(cell_2)|<\beta(\sigma(cell_1)+\sigma(cell_2))$ where:
  $C(cell_x)$ is the average color vector of the $cell_x$;
  σ is the standard deviation of a component of color; and
  β is a parameter, in this embodiment equal to 0.7.
When a voting array cell is determined to be the same color as one of its neighbor voting array cells, the cells in each of the three arrays corresponding to the average line segment color are merged. Merging of cells is carried out according to the following:

$votes_{new}=votes_1+votes_2$ $C_{new}=(votes_1*C_1+votes_2*C_2)/votes_{new}$ $var_{new}=(votes_1*(var_1+(C_{new}-C_1)^2)+votes_2*(var_2+(C_{new}-C_2)^2))/votes_{new}$ Once cell merging has been completed, the candidate background region colors are ranked in order based on the vote values in the voting array cells associated with the line segment groups representing the candidate background region colors. The candidate background region color associated with the highest vote value is considered most likely to be the true candidate background region color. Candidate background region colors associated with lower vote values are considered less likely to be the true candidate background region color. The image pixels associated with the line segment groups representing each candidate background region color are then processed beginning firstly with the highest ranked candidate background region color (step 318). At this stage, the image pixels that correspond to the line segments in the group representing the candidate background region color are identified. In particular, an image pixel p is determined to be of the background region color C if:

$$|C_i - p_i| < \max(\sigma_i, \delta), i \in \{r, g, b\}$$

In this embodiment, the parameter 6 is equal to ten (10) which has been found to yield good performance.

Once the image pixels corresponding to the candidate background region color have been identified, edge detection is performed and an edge map corresponding to the input image is generated. Edge pixels are defined as those having an inverse status (background or non-background) between themselves and either the nearest pixel to the left or the nearest pixel below. In particular, given a candidate background region color C, a pixel p is considered to be an edge pixel if:

$$(C(p) \hat{+} C(p_1)) V (C(p) \hat{+} C(p_b)))$$

where:
 $p_1$ is the pixel to the left of pixel p; and
 $p_b$ is the pixel below the pixel p.
Thus, for pixel p to be considered an edge pixel, one of the following conditions must be true:
 pixel p is of the background region color but pixel $p_1$ is not;
 pixel $p_1$ is of the background region color but pixel p is not;
 pixel p is of the background region color but pixel $p_b$ is not; and/or
 pixel $p_b$ is of the background region color but pixel p is not.

Figure 9A:
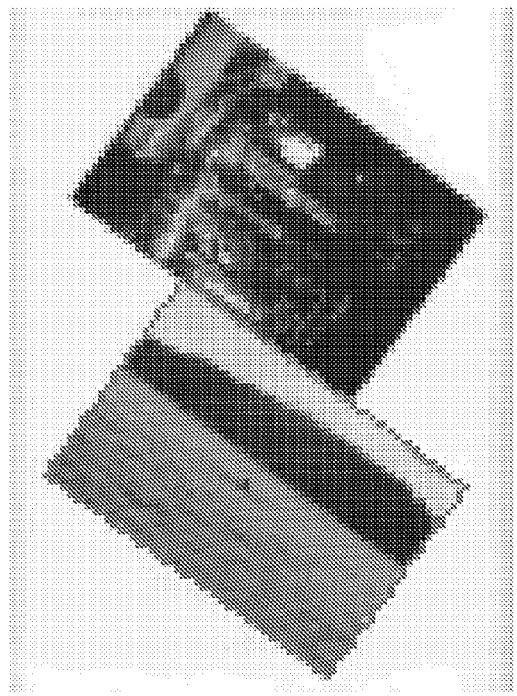
FIG. 9A is an image of two rectangular photographs.
Figure 9B:
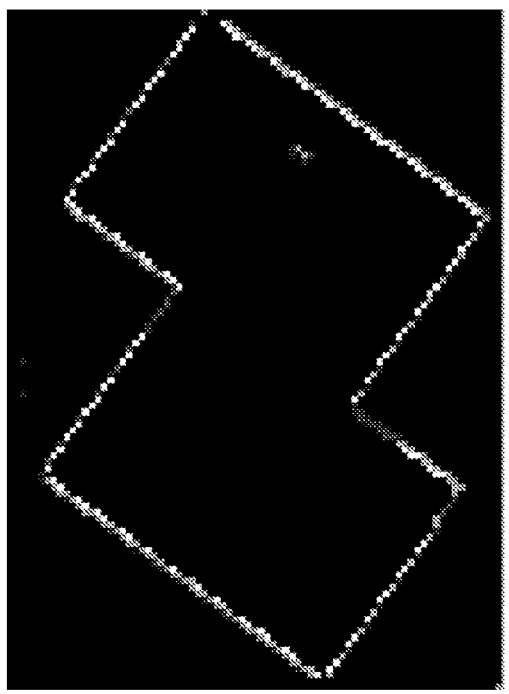
FIGS. 9B and 9C are edge and blurred edge maps corresponding to the image of FIG. 9A.

FIGS. 9A and 9B shows an input image having two rectangular photographs therein and a corresponding edge map generated as a result of edge detection. The above process ensures that edges are detected only on the boundaries between background-colored and non-background-colored regions. Non-edge pixels are assigned zero edge strength. For the remaining edge pixels, a pixel edge strength is calculated (step 320) according to Equation (10) below:

$$\text{EdgeStrength} = \delta(\text{pixel } p_u, \text{pixel } p_b) + \delta(\text{pixel } p_1, \text{pixel } p_r) \quad (10)$$

where:
 $\delta(a, b) = \min(\max(|a_i - b_i|), i \in \{r, g, b\}, \Delta)$;
 $p_u$ is the pixel above pixel p; and
 $p_r$ is the pixel to the right of pixel p.
This results in a nonlinear estimation of edge strength allowing all meaningful edges to be identified. In this embodiment, the parameter Δ is equal to one-hundred and twenty-seven (127). This value has been found to yield good performance.

After the image pixels of each line segment group representing the candidate background region colors have been processed in the manner described above, the number of edge pixels and the average intensity of the edge pixels associated with each candidate background region color are used to determine the true background region color. When an input image has more than two standard sized photographs in it, line segments of the background region color tend to be shorter and fewer in number. As a result using only line segment information is not reliable. The edge pixel number and intensity information has been found to be reliable in selecting the true background region color. In order to determine the true background region color, initially the background region color X represented by the line segment group having an edge pixel count that is closest to an expected edge pixel count value is selected. For example, for a 79×109 image, the expected edge pixel count is equal to five-hundred (500). With the candidate background region color X selected, the candidate background region color represented by the line segment group having an edge pixel count within two-hundred (200) of the edge pixel count of selected candidate background region color X and having the highest average edge strength is determined to be the true background region color. Appendix C is a pseudocode implementation of the above procedure. In this manner, a highly plural color for the background region that is contiguous and that forms sharp border edges of an expected size is selected as the true background region color.

The grouping of edge pixels to form line segments at step 120 is accomplished using a modified total least squares method in which the pixels on the line segments are weighted by their salience as edge pixels, in this case by edge strength. An unmodified total least squares method of determining a line segment from a set of points is akin to statistically fitting an ellipse to the set of points and designating the major axis of the ellipse as the line segment when the ratio of the minor to major ellipse axes is smaller than a threshold. A threshold equal to 0.3 has proven to be effective. The modified total least squares method differs in that the cost of a pixel with a small weight being away from the major ellipse axis is smaller than if the weight were larger. The weaker eigenvalue of the pixel is indicative of the ellipse axis ratio.

At step 120, during grouping of edge pixels into line segments, a small group of spatially connected edge pixels is initially selected, in this case eight (8) edge pixels. The edge pixels are fitted to a line segment using the modified least squares method described above. During this method, the major eigenvector of the weighted covariance matrix of the coordinates of the edge pixels is computed. Neighboring pixels that lie in proximity to and along the line segment are added to the group until the minor eigenvalue of the weighted covariance matrix exceeds the threshold. This process is similar to that disclosed in the publication entitled "The Hough Transform Versus the UpWrite" authored by McLaughlin et al. (IEEE Trans. On PAMI, Vol. 20, No. 4, April 1998), the content of which is incorporated herein by reference.

At step 130 during corner detection, the line segments in the group are examined to detect pairs of line segments that are within a threshold distance. In this embodiment, the threshold distance is twenty-five (25) pixels. For each detected pair of line segments, the line segments are examined to determine if the line segments generally form a right angle and thus, represent a corner. In this embodiment, the line segments of a pair must be within $\frac{1}{10}^{th}$ radians of a right angle (90 degrees) to be considered as representing a corner. If the line segments are deemed to represent a corner, a corner is hypothesized at the real or extrapolated intersection of the line segments. The corner is assigned corner orientations that relate to the bisector of the angle between the line segment pair according to:

$$(\Theta_1 + \Theta_2)/2 + k\pi/2, k = 0, 1, 2, 3$$

The multiple angles take into account the possibility that the input image may have up to four (4) photographs therein with the four photographs meeting near one detected corner.

Figure 6:
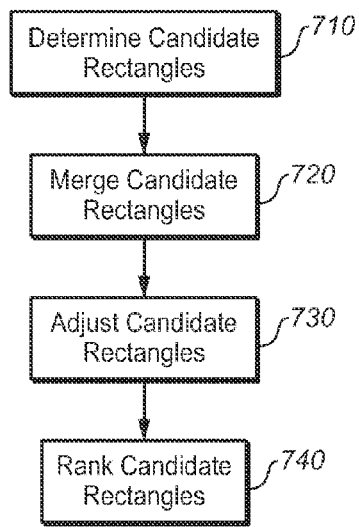
FIG. 6 is a flowchart showing the steps performed during candidate rectangle detection.

At step 140 as shown in FIG. 6, the detected corners are first used to determine candidate rectangles 710. Candidate rectangles are determined when the orientation of a pair of corners is opposite. In many instances, multiple candidate rectangles are determined in the input image. Once the candidate rectangles have been determined, selected candidate rectangles are merged to remove duplicates (step 720). In this embodiment, if the maximum distance difference in corresponding vertices of two candidate rectangles is two (2) pixels, the candidate rectangles are deemed to be duplicates.

Figure 7:
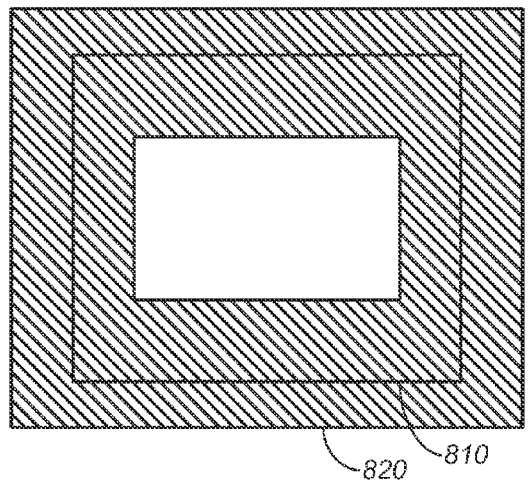
FIG. 7 shows a candidate rectangle and its neighborhood.

Since the candidate rectangles defined by the detected corners may be imprecise, the candidate rectangles are adjusted (step 730). During adjusting of a candidate rectangle, a neighborhood 820 is established around the candidate rectangle 810 as shown in FIG. 7. Inside that neighborhood 820 a search is performed to find the best adjusted positions for the sides of the candidate rectangle. The search is based on edge strength near the candidate rectangle sides, the difference between the measure of non-backgroundedness of pixels just outside of the candidate rectangle and the measure of backgroundedness of pixels just inside the candidate rectangle, and the strength of color edges across the candidate rectangle sides.

Figure 9C:
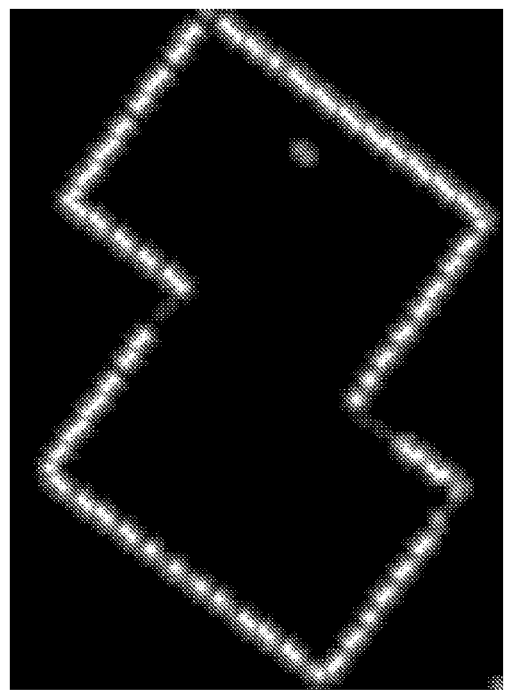

Initially for each candidate rectangle side, three (3) statistics S1, S2 and S3 are determined. Firstly, the edge map generated as a result of edge detection is blurred with a Gaussian kernel of the form:

$$\begin{vmatrix} 1 & 4 & 6 & 4 & 1 \\ 4 & 16 & 26 & 16 & 4 \\ 6 & 26 & 41 & 26 & 6 \\ 4 & 16 & 26 & 16 & 4 \\ 1 & 4 & 6 & 4 & 1 \end{vmatrix}$$

to yield a resultant blurred edge map BEM(x,y). The blurred edge map defines the first statistic S1. The pixels of the resulting blurred edge map BEM(x,y) represent the likelihood that the side of the candidate rectangle passes near (x,y). FIG. 9C shows the edge map of FIG. 9B after having been blurred.

Non-backgroundedness of a pixel p is calculated according to Equation (11) below:

$$\text{ColorScore}=\min(4,\Gamma) \text{ where } F=\max_{RGB}((\text{pixel}(i)-c(i))/\sigma_i) \quad (11)$$

where:
pixel(i) is the i-th component of the RGB color pixel;
c(i) is the i-th component of the RGB color of the background region; and
$\sigma_i$ is the i-th component of the standard deviation of the background region color.

For each candidate rectangle side, the average difference of the non-backgroundedness scores of pairs of pixels (a,b) just outside and just inside the candidate rectangle is determined thereby to deliver the second statistic S2.

The average of delta for all pairs of pixels (a,b) is then determined to define the third statistic S3, where delta is defined as:

$$\delta(a, b)=\min(\max(|a_i-b_i|), i\in\{r,g,b\},\Delta)$$

The above statistics S1, S2 and S3 in this embodiment are computed using integer arithmetic based on Bresenham's algorithm for line drawing/tracing.

Figure 8:
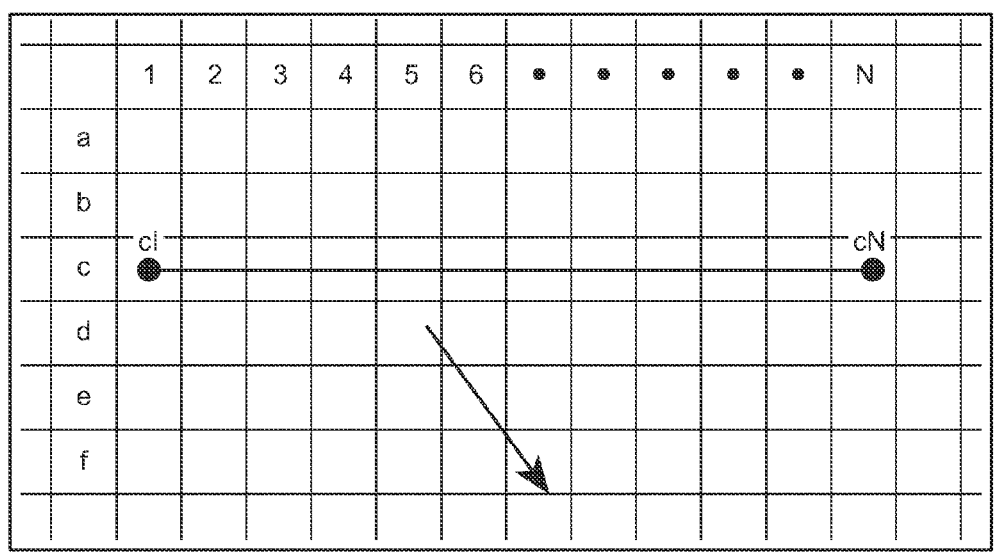
FIG. 8 is a normalized representation of a candidate rectangle side.

With the three statistics computed for each candidate rectangle side, a local search is performed to determine the best location for each candidate rectangle side. During this process, an objective function of the form O(S1, S2, S3)=S1+8S2+16 S3 is optimized. For example, FIG. 8 shows a candidate rectangle side on a coordinate grid where for simplification, the side is shown parallel to the x-axis. During the local search an iterative search algorithm is employed to determine if the candidate rectangular side needs to be moved.

According to the search algorithm four variables p1 to p4 are defined as follows:

$$p1 = \sum_{i=1}^{N/2} \begin{bmatrix} (BEM(b, i) - BEM(c, i)) + \\ 8((colorScore(d, i) - colorScore(b, i)) - \\ (colorScore(c, i) - colorScore(a, i))) + \\ 16(\delta([a, i], [c, i]) - \delta([b, i], [d, i])) \end{bmatrix}$$

$$p2 = \sum_{i=1}^{N/2} \begin{bmatrix} (BEM(d, i) - BEM(c, i)) + \\ 8((colorScore(e, i) - colorScore(c, i)) - \\ (colorScore(c, i) - colorScore(a, i))) + \\ 16(\delta([e, i], [c, i]) - \delta([b, i], [d, i])) \end{bmatrix}$$

$$p3 = \sum_{i=N/2+1}^{N} \begin{bmatrix} (BEM(b, i) - BEM(c, i)) + \\ 8((colorScore(d, i) - colorScore(b, i)) - \\ (colorScore(c, i) - colorScore(a, i))) + \\ 16(\delta([a, i], [c, i]) - \delta([b, i], [d, i])) \end{bmatrix}$$

$$p4 = \sum_{i=N/2+1}^{N} \begin{bmatrix} (BEM(d, i) - BEM(c, i)) + \\ 8((colorScore(e, i) - colorScore(c, i)) - \\ (colorScore(c, i) - colorScore(a, i))) + \\ 16(\delta([e, i], [c, i]) - \delta([b, i], [d, i])) \end{bmatrix}$$

With reference to the candidate rectangle side of FIG. 7, if variable p1 is much greater than zero (0), the coiner point c1 should be moved up to optimize the objective function O as this situation that signifies that edge b is stronger than that of edge c. If variable p3 is significantly greater than zero (0), the corner point c1 should be moved down to optimize the objective function O as this situation signifies that edge d is stronger than that of edge c. If variable p3 is significantly greater than zero (0), the corner point cN should be moved up to optimize the objective function O as this situation signifies that edge b is stronger than that of edge c. If variable p4 is significantly greater than zero (0), the corner point cN should be moved down to optimize the objective function O as this situation signifies that edge d is stronger than that of edge c. Based on the conditions above, an iterative procedure is performed whereby the corner points defining the ends of the rectangle sides are either pulled up or pulled down to adjust the position of the rectangle sides. Appendix D is a pseudocode implementation of this procedure. The iterations are performed for the candidate rectangle while the rectangle side positions change or until ten (10) iterations have been completed. Once the adjusted candidate rectangle has been generated, the angles between adjoining sides of the candidate rectangle are examined to ensure that they do not deviate by more than five (5) degrees from a right angle. If any of the adjoining sides forming the adjusted rectangle deviate by more than five degrees, the unadjusted candidate rectangle is used.

As an alternative, it is possible to derive an accurate rectangle edge via a trained machine learning process. The machine learning process can use as variables, the inputs named above i.e. non-backgroundness difference across the rectangle side, and associated edge strengths.

With adjustment of each of the candidate rectangles complete, the candidate rectangles are ranked (step 740). During ranking, differentiating factors based at least on edge and color information associated with pixels proximate the candidate rectangles are used. In this embodiment, the following differentiating factors are used to validate candidate rectangles: (i) strong edge points located on or near the candidate rectangle; (ii) the sum of the squared length of line segments that lie inside the candidate rectangle; (iii) the number of non-background colored pixels inside the candidate rectangle; (iv) the number and strength of edge pixels inside the candidate rectangle; (v) the area of the candidate rectangle; and (vi) when the candidate rectangle extends beyond the image, the number of non-background colored pixels where the image edge truncates the candidate rectangle.

The blurred edge map BEM(x,y) allows factor (i) to be determined. Factor (ii) is determined using the ColorScores for the pixels on the pixel rows within the candidate rectangle. A cumulative row array method is used which reduces the number of calculations from N×M to N. Factors (iv) and (vi) are calculated in a manner similar to Factor (ii), substituting edge strength for ColorScore. Determining Factors (iii) and (v) is apparent from the description above.

The following table of statistics are then calculated using the aforementioned six factors for each of the candidate rectangles:

| Statistic | Factor(s) or Statistic Components |
|---|---|
| 1 | Factor (ii) |
| 2 | Factor (i) along candidate rectangle edge 1 |
| 3 | Factor (i) along candidate rectangle edge 2 |
| 4 | Factor (i) along candidate rectangle edge 3 |
| 5 | Factor (i) along candidate rectangle edge 4 |
| 6 | Factor (iv) mean average |
| 7 | Σ of Statistics 2 to 5 |
| 8 | Factor (iii) mean average |
| 9 | Image Area - Factor (v) |
| 10 | Factor (vi) |
| 11 | The infinity-norm of the standard deviation of the background region color estimate. The infinity norm is calculated for a vector as the maximum of the absolute value of the vector components |
| 12 | Statistic 11 * Statistic 8 |
| 13 | Statistic 8/Max(Statistic 8(for all candidate rectangles)) |
| 14 | Statistic 1/Max(Statistic 1(for all candidate rectangles)) |
| 15 | Statistic 2/Statistic 3 |
| 16 | Statistic 4/Statistic 2 |
| 17 | Statistic 2/Statistic 5 |
| 18 | Statistic 5/Statistic 4 |
| 19 | Statistic 2/Max(Statistic 2(for all candidate rectangles)) |
| 20 | Statistic 3/Max(Statistic 3(for all candidate rectangles)) |
| 21 | Statistic 4/Max(Statistic 4(for all candidate rectangles)) |
| 22 | Statistic 5/Max(Statistic 5(for all candidate rectangles)) |

The above statistics are used with a machine learning classifier of decision stumps which are boosted using Discrete Adaptive Boosting (AdaBoost). The AdaBoost technique learns a sequence of weak classifiers, and boosts the ability of the weak classifiers to act as indicators by linearly combining the weak classifiers to build a single strong classifier. At every iterative stage, a 'weak learner' function (i.e., one that has an accuracy only slightly greater than random chance) is trained with the data. The output of the weak learner is then added to the learned function, with some strength (proportional to the accuracy of the weak learner). The data is then re-weighted or boosted, so that future iterations of weak learner functions will have a greater probability of avoiding the same error.

The classifier is pre-trained, using features obtained from synthetically generated image samples having known segments to yield constants (q,r) for Equation (12) below:

$$\text{AdaBoostScore}(st_1, st_2, \ldots, st_{22}) = q_1 * (st_1 > r_1) + q_2 * (st_2 > r_2) + \ldots + q_{22} * (st_{22} > r_{22}) \quad (12)$$

where:

$st_x$ is the $x^{th}$ statistic of the table above.

Although this type of classifier is used normally for non-confidence classification, the classifier output score provides a useful measure of candidate rectangle rank.

Following the above, the difference s2 between background and non-background pixels across the rectangle boundaries and the strengths s3 of the color edges across the rectangle boundaries are determined. A score for each candidate rectangle is then calculated according to Equation (13) below:

$$\text{candidate rectangle score}(r) = \text{AdaBoostScore}(r) + a * s2(r) + b * s3(r) \quad (13)$$

where:

a and b are constants and in this element are equal to 0.004 and 0.002 respectively.

The candidate rectangles are then ranked by score. Once ranked, the candidate rectangles are examined to determine if any candidate rectangles overlap. For two overlapping candidate rectangles, if a higher ranked candidate rectangle overlaps a lower ranked candidate rectangle by more than 30%, the lower ranked candidate rectangle is discarded. As mentioned previously, steps 130 to 170 are performed iteratively until the ranked candidate rectangles represent the photographs in the input image.

The object detection application may run as a stand-alone digital image tool or may be incorporated into other available digital image processing applications to provide enhanced functionality to those digital image processing applications. The software application may include program modules including routines, programs, object components, data structures etc. and be embodied as computer-readable program code stored on a computer-readable medium. The computer-readable medium is any data storage device that can store data, which can thereafter be read by a computer system. Examples of computer-readable medium include for example read-only memory, random-access memory, hard disk drives, magnetic tape, CD-ROMs and other optical data storage devices. The computer-readable program code can also be distributed over a network including coupled computer systems so that the computer-readable program code is stored and executed in a distributed fashion.

Although particular embodiments have been described, those of skill in the art will appreciate that variations and modifications may be made without departing from the spirit and scope thereof as defined by the appended claims.

Appendix A
Procedure 1
  To determine the end pixel of a line segment that starts with pixel s
    Include pixels s and s+1
    On iteration 1, keep average color in RGB of the line segment
    Keep the sum of squared deviations from the average color as an estimate of n*var(line segment)
    If pixels k+1, k+2, ... k+N change all three color components of the average in the same direction, assign pixel k as the last pixel of the line segment
Appendix B
Procedure 2
  Segment each row and column into uniformly colored line segments using Procedure 1
  For each line segment if larger than a*length(row) or a*length(column)
    Length(line segment) votes cast into cell of voting array that corresponds to the average color of the line segment
    Length(line segment)*color(line segment) added to the cell in the color array that corresponds to the average color of the line segment Length(line segment)*var(line segment) added to the cell in the variance array that corresponds to the average color of the line segment Appendix C
Procedure 3
  Determine most likely candidate background region colors
  Select background region color with edge pixel count edgeCount(C) closest to x
  Select background region color with edge pixel count within 200 of edgeCount(C) whose average edge strength is largest Appendix D
Procedure 4
  While a change in c1 or cN occurs and less than ten iterations are completed
    For all rectangle sides compute pull1, pull2, pull3, pull4
    If(pull1)

$$c1=c1+1$$

If(pull2)

$$c1=c1-$$

If(pull3)

$$cN=cN+1$$

If(pull4)

$$cN=cN-1$$

What is claimed is:

1. A method of detecting generally rectangular objects in an image comprising using a processing unit to:
   determine candidate rectangles in the image based on detected corners in the image;
   rank the candidate rectangles on the basis of a set of differentiating factors;
   detect objects in said images based on the ranked candidate rectangles
   estimate a background color of said image;
   detect edges delimiting the objects on the basis of the estimated background color;
   examine the edges to detect intersecting edges representing corners; and
   group corners that define vertices of a rectangle thereby to determine the candidate rectangles.

2. The method of claim 1 further comprising, prior to said ranking, discarding selected candidate rectangles.

3. The method of claim 2 wherein selected candidate rectangles are discarded when they overlap with higher ranked candidate rectangles by more than a threshold amount.

4. The method of claim 3 further comprising, prior to said ranking, merging proximate candidate rectangles.

5. The method of claim 4 wherein said set of differentiating factors is based at least on edge and color information associated with pixels proximate the candidate rectangles.

6. The method of claim 4 further comprising, prior to said ranking, adjusting boundaries of the candidate rectangles.

7. The method of claim 6 wherein during said adjusting, the positions of the corners defining the candidate rectangles are adjusted within neighborhoods surrounding the candidate rectangles.

8. The method of claim 1 further comprising, prior to said ranking, adjusting boundaries of the candidate rectangles.

9. The method of claim 8 further comprising, prior to said ranking, discarding selected candidate rectangles.

10. The method of claim 9 wherein selected candidate rectangles are discarded when they overlap with higher ranked candidate rectangles by more than a threshold amount.

11. The method of claim 10 further comprising, prior to said ranking merging proximate candidate rectangles.

12. A tangible, non-transitory computer readable medium embodying a computer program comprising program code for carrying out the method of claim 1 when executed by a computer.

13. An apparatus for detecting generally rectangular objects in an image comprising:
   memory for storing the image; and
   a processing unit communicating with said memory, said processing unit processing the image to:
   determine candidate rectangles based on detected corners in the image;
   rank the candidate rectangles on the basis of a set of differentiating factors;
   determine objects in the images from the ranked candidate rectangles;
   estimate a background color of said image;
   detect edges delimiting the objects on the basis of the estimated background color;
   examine the edges to detect intersecting edges representing corners; and
   group corners that define vertices of a rectangle thereby to determine the candidate rectangles.

14. An apparatus according to claim 13 wherein said processing unit, prior to said ranking, further processes the image to at least one of discard selected candidate rectangles, merge proximate candidate rectangles and adjust candidate rectangles.

15. An apparatus according to claim 14 wherein said processing unit processes the image to discard selected candidate rectangles, merge proximate candidate rectangles and adjust candidate rectangles.

* * * * *